United States Patent
Kostrzewa

[11] 4,057,467
[45] Nov. 8, 1977

[54] INTEGRATED PRESSURIZED-WATER REACTOR AND STEAM GENERATOR

[75] Inventor: Siegfried Kostrzewa, Bruckfeld, Germany

[73] Assignee: Interatom, Internationale Atomreaktorbau GmbH., Cologne, Germany

[21] Appl. No.: 608,755

[22] Filed: Aug. 28, 1975

[30] Foreign Application Priority Data

Sept. 5, 1974    Germany ............................ 2442500

[51] Int. Cl.² .............................................. G21C 15/00
[52] U.S. Cl. ............................................ 176/65; 176/61
[58] Field of Search ........................ 176/61, 64, 65, 50

[56] References Cited

U.S. PATENT DOCUMENTS

| | | | |
|---|---|---|---|
| 3,245,881 | 4/1966 | Ammon et al. | 176/61 |
| 3,255,089 | 6/1966 | Deighton | 176/65 |
| 3,267,906 | 8/1966 | Deighton | 176/65 |
| 3,290,222 | 12/1966 | Schoessow et al. | 176/65 |
| 3,383,288 | 5/1968 | Deighton | 176/64 |
| 3,384,549 | 5/1968 | Deliege et al. | 176/65 |
| 3,385,760 | 5/1968 | Hawkins | 176/61 |

*Primary Examiner*—Samuel W. Engle
*Assistant Examiner*—S. A. Cangialosi

*Attorney, Agent, or Firm*—Kenyon & Kenyon, Reilly, Carr & Chapin

[57] ABSTRACT

An integrated pressurized-water reactor and steam generator is disclosed, particularly for ship propulsion and smaller stationary installations, in which circulating pumps of primary coolant loops are arranged in the upper part of a vertical pressure vessel close to the vessel's removable head. An annular steam generator is arranged centrally within the vessel, and above the outer periphery of a reactor core in the vessel's lower portion, and is suspended via a separate hollow ring supported by the vessel's upper portion and in which the impellers of the circulating pumps are arranged. The primary cooling water flows upwardly through the reactor core and the heat exchanger to the pumps located above, and from there, through a separate ring passage outside of the heat exchanger housing and core downward to again flow upwardly through the reactor core. Secondary steam and primary feed water nozzles can be disassembled sideways, so that although normally connecting with internal parts, all internals can be removed upwardly from the pressure vessel so that the pressure vessel can be checked everywhere. In the event of a failure of the circulating pumps, the afterheat given off by the reactor core after being shut down, is transmitted to the heat exchanger through natural thermal circulation of the water in the vessel.

8 Claims, 3 Drawing Figures

INTEGRATED PRESSURIZED-WATER REACTOR AND STEAM GENERATOR

BACKGROUND OF THE INVENTION

The present invention concerns a pressurized-water reactor whose primary cooling system gives off its heat within a pressure vessel to a steam generator within the vessel and which is inserted between the reactor core and the intake space of the circulating pumps, i.e., in the cold leg of the main coolant loop. This pressurized-water reactor, whose primary cooling system is normally operated with forced circulation, is particularly well suited for ship propulsion and stationary installations of smaller power rating. In order to avoid damage to the circulating pumps of the primary cooling system due to cavitation, particularly in the case of rapid load changes, these pumps should operate in a zone as cool as possible, of the primary cooling system. If these pumps operate at close to the boiling temperature of the pressurized-water coolant, a small brief lowering of the normal pressure is sufficient to cause the water in the pump housings to boil. The steam bubbles produced in this manner collapse during any subsequent pressure increase and cause destruction at the pump internals in a locally closely confined area. Particularly exposed in this respect are circulating pumps which, for reasons of better maintenance and inspection, are preferably located above the core and steam generator, because as compared to pumps located underneath, such pumps receive a considerably smaller inflow head or hydrostatic pressure and therefore have a greater tendency toward cavitation. These problems are often avoided by means of an external pressurizer for the coolant which, however, requires much space and is expensive.

A typical example for a shipboard reactor proven in practice is represented by the propulsion plant of the nuclear vessel "OTTO HAHN". In this arrangement, with a pump located at the bottom of the pressure vessel, the desired flow can be realized with water as cold as possible ahead of the pump and with a considerable inflow head to the pump. If, with the design the same otherwise, the circulating pump or pumps are arranged at the upper end of the pressure vessel, e.g., in its closure head end, the pumps not only are approached by the hotter primary coolant, but the inflow head is at the same time also reduced considerably.

In the disclosures of the German Offenlegungsschrift No. 22 27 895 (U.S. Ser. No. 153,304, filed June 15, 1971 now U.S. Pat. 3,888,734) the described problems with the circulating pumps are avoided by using a very large and, therefore, also expensive external pressurizer. In this external pressurizer, the pressure in the pressure vessel is adjusted to the desired level by controlled heating of the water in the pressurizer or injection of cold water. In the same disclosures, it is proposed to support all the internals in the pressure vessel at the vessel's upper closure head, so that for every refueling and every inspection or maintenance action on internals in the pressure vessel, practically all the internals must be removed together from the pressure vessel, with their considerable weight. Such refueling is necessary about every one to two years, while a routine inspection is necessary only every 8 years. It is therefore desirable that the fuel assemblies can be exchanged without the necessity to remove the steam generator.

In order to obtain the desired flow path from the reactor through the heat exchanger to the circulating pump, it is proposed in the same disclosures to have the flow through the reactor core go in normal operation from top to bottom. This flow path results, in the case of load changes or at low load as well as in the event of a failure of the circulating pumps, in very confusing flow conditions in the reactor core which should be avoided.

An object of the present invention is to provide a pressurized-water reactor whose primary cooling system gives off its heat within a pressure vessel, to a steam generator which within the pressure vessel is inserted between the reactor core and the suction space of the circulating pumps, and which can be disassembled without destruction for inspecting the pressure vessel.

A specific object of the present invention is to provide an arrangement of a steam generator which can take up the decay heat of the reactor core through natural circulation in the event of a failure of the circulating pumps and lowering of the water level.

A further object of the present invention is to provide a pressurized-water reactor whose internals in the pressure vessel, fabricated from austenitic metal, can expand freely relative to the pressure vessel, which is made of ferritic metal.

SUMMARY OF THE INVENTION

According to the present invention, the annular steam generator is arranged in a hollow cylindrical housing, which is closed on all sides excepting for openings for directing the coolant flow, and which is supported on the upper end of the pressure vessel via a hollow ring supported by the vessel; a core support structure with an assembled reactor core being likewise suspended by this housing; and this housing being radially braced at the lower end via several vertically sliding surfaces against the inner wall of the pressure vessel. With this arrangement, all important internals within vessel are suspended in the pressure vessel with the exception of the pumps and the feed water and steam nozzles, by the housing, the hollow ring being firmly clamped at the upper end of the pressure vessel between a step or internal flange formed by the pressure vessel and the inner periphery of closure head of the pressure vessel. This housing is made of austenitic metal but can freely expand downward within the ferritic metal pressure vessel, and it is supported at its lower end at several places, vertically sliding at the inner wall of the pressure vessel, so that forces in the horizontal direction can be taken up by the pressure vessel. The core housing is fastened on the one hand at the already described steam generator housing and can be centered with its lower end by a likewise vertically sliding post, so that is follows all expansions of the housing in the axial direction and transmits in the horizontal direction the occurring forces to the pressure vessel. In this manner, all welded steam for lugs or other fastening means, which cannot be checked, are avoided at the pressure vessel and the ultrasonic testing of the pressure vessel wall is facilitated. All the pressure vessel internals may be fabricated of the same material, so that stresses induced by unequal expansion are eliminated. The arrangement of the steam generator in a cylindrical housing closed on all sides not only has the advantage that the thin tubes of this steam generator can be protected better against vibrations, but it also protects this steam generator against damage during installation and disassembly. The hollow ring of box-like cross section serves, on the one hand, to stiffen the steam generator housing with all internals attached thereto, and, on the other hand, serves to guide the flow. The inclined positions, which are unavoidable in a shipboard reactor, do not cause trouble with the water circulation either in normal operation or in the event of a failure of the pumps, as they can have an effect only in the relatively narrow, ring-shaped steam generator housing. Thus, the structural height of the pressure vessel above the pumps can be decreased considerably.

In a further embodiment of the invention, the hollow ring forms the pressure chamber of the primary circulation pumps and is penetrated by several inlet sections which communicate with the intake space of the circulating pumps. In this manner, each pump has its own inlet section favorably shaped from a flow point of view; all the pumps together, however, push into the hollow ring of box-shaped cross section which has several openings at its underside, so that the primary cooling water can flow to the reactor core, distributed uniformly over the circumference, also in the event of a failure of a pump.

BRIEF DESCRIPTION OF THE DRAWINGS

The principles of the present invention are illustrated by the accompanying drawings, in which.

DETAILED DESCRIPTION OF THE INVENTION

Figure 1:
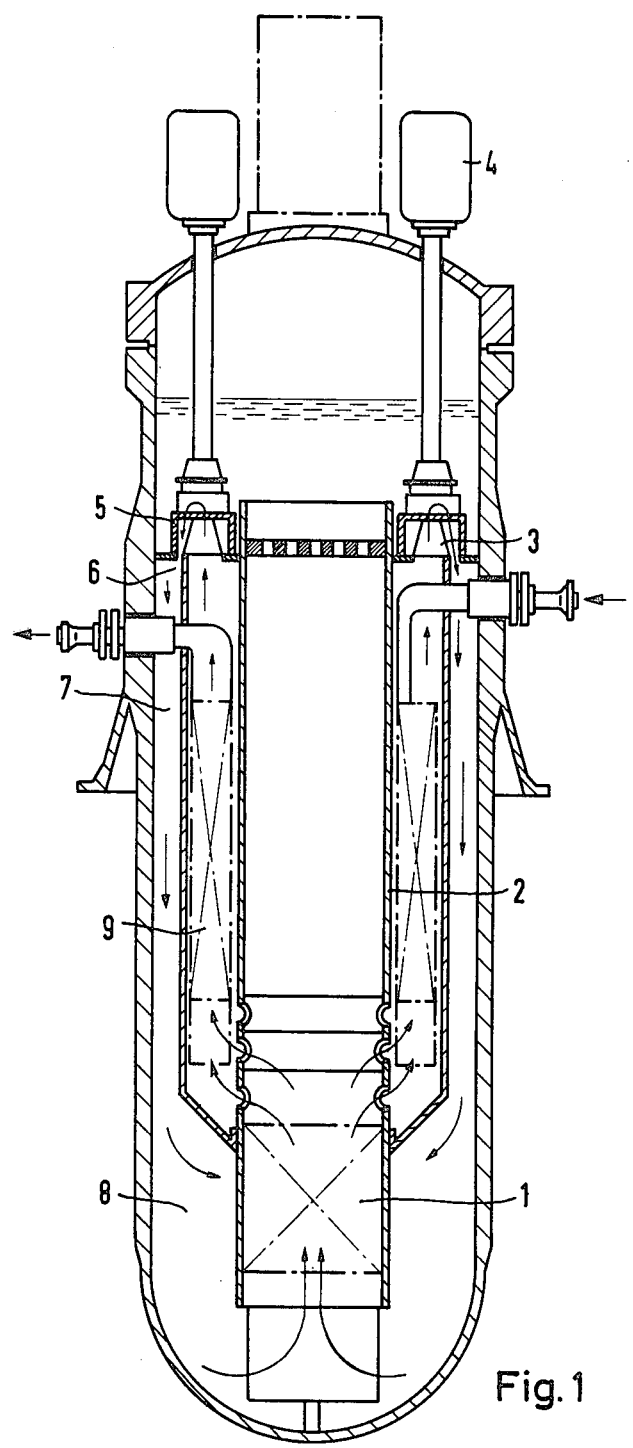
FIG. 1 in vertical section, schematically shows the primary coolant flow paths in a pressurized-water reactor using those principles.

In FIG. 1 the primary cooling water enters from the bottom into the reactor core 1, which consists of numerous, vertical, parallel fuel assemblies, not shown, and flows from there to an annular steam generator housing 2 concentrically arranged above the reactor core 1, flows through the housing 2 from the bottom to the top and is pushed by pumps 3, which are driven by electric motors 4, into the previously referred to hollow ring 5 of box-shaped cross section, which has at its underside, and more specifically, at its outer rim, numerous openings 6, through which the primary cooling water flows downwardly into a ring canal or passage 7 and from there into a space 8 to the side and below the reactor. Should the primary circulating pumps 3 fail, a natural thermal circulation system is set up, in which the hot primary water flows upward in the reactor core as in normal operation. As the steam generators 9 remain in operation, the primary cooling water is cooled down here. First, natural circulation is produced through the standing mechanism of the pumps 3. When the water level drops, an internal natural thermal circulation system is set up between the hot reactor core 1 and the cold steam generator 9, which can be utilized for the emergency removal of the core decay heat.

Figure 2:
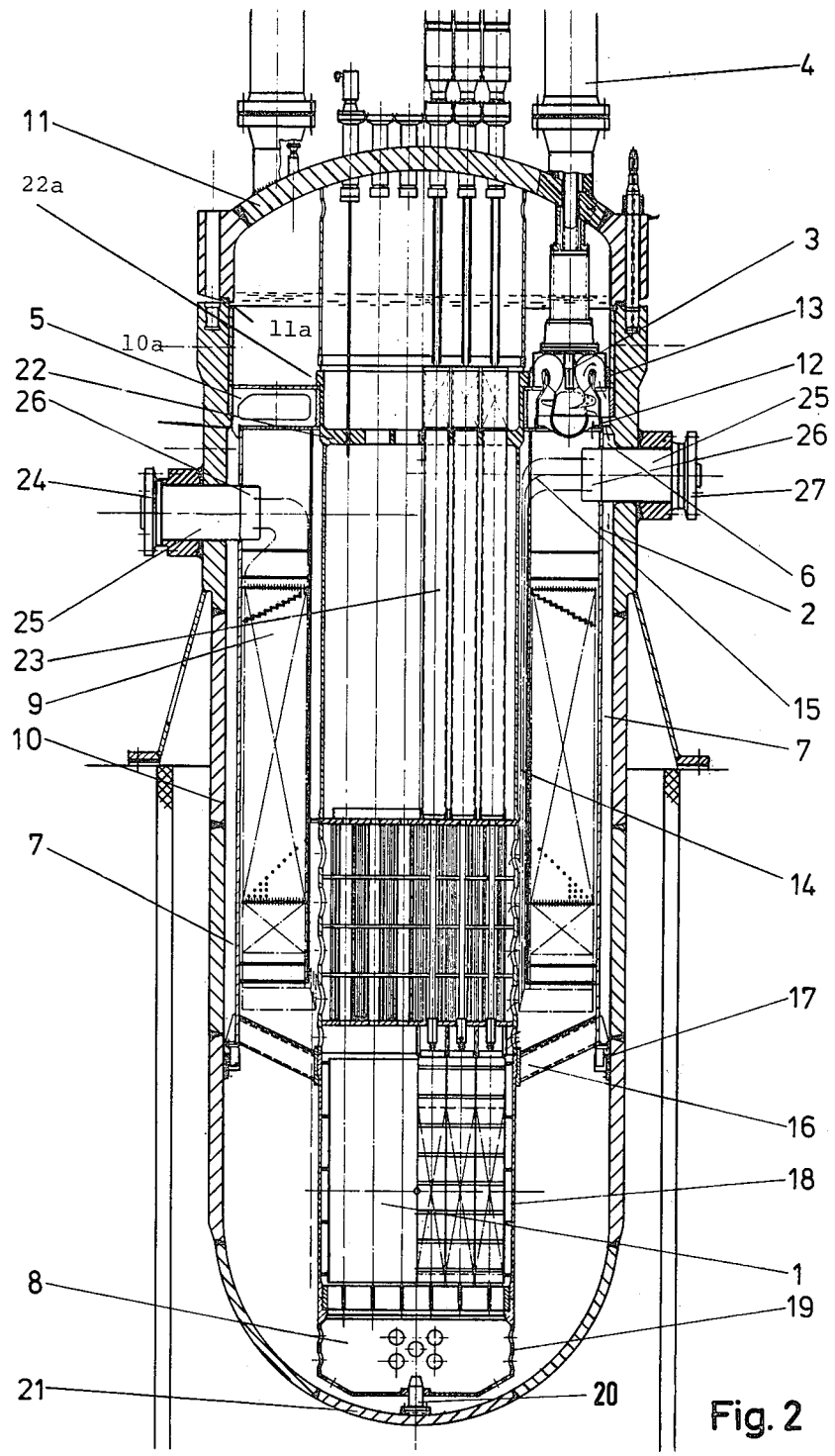
FIG. 2 is a vertical section showing the more important constructional details of such a reactor.

FIG. 2 shows how the hollow ring 5 is clamped between a step or internal flange 10a of the pressure vessel 10 and the inner periphery 11a of the closure head 11. This clamping point is made in a manner not shown in detail of a ferritic metal which is coated with a thin austenitic metal, so that no appreciable thermal expansion can occur with respect to the ferritic metal pressure vessel. The hollow ring 5 carries, depending on the number of pumps, for instance, four inlet sections 12 (see FIG. 3), through which the primary water cooled down in the steam generator 9 flows from the steam generator housing 2 into the running mechanisms of the pumps 3. In each pump housing 13, the primary water is deflected and pushed into the hollow ring 5, which communicates with the ring canal or passage 7 via openings 6 which are distributed over the circumference of the parts. This ring canal 7 is formed on the one hand by the inner wall of the pressure vessel 10 and, on the other hand, by the outer wall of the steam generator housing 2. This steam generator housing 2, in turn, is bounded at its inside wall by a separate, closed ring canal 14, into which the cold feed water pipes 15 are led downward. The steam generator housing 2 is supported at several vertically sliding surfaces 17 against the inside wall of the pressure vessel 10 and is terminated at its lower end by a conical bottom 16 which supports, on the other hand, the core barrel 18, containing the core 1, which has at its lower end an inlet cage 19 which is provided with numerous holes and is centered at the pressure vessel bottom 21 in a vertically slidable manner via a central post 20. The core barrel 18 rests with a projection on the conical bottom 16 of the steam generator housing 2 and is secured there by the support structure 22, which can be bolted to the hollow ring 5 at its upper side. This support structure 22 serves at the same time for guiding and mounting the control rod drives 23. As shown by FIG. 2, this support structure 22 has a top periphery provided with an external flange 22a in engagement with the hollow ring 5.

The steam nozzle 24 as well as the feed water nozzle 27 are connected via a welded lip seal with the pressure vessel 10 and carry on the inside short pipe stubs 25 which are brought through the ring canal 7 and are likewise connected by a welded lip seal. The lip seals permit the pipe stubs to be slid outwardly and free from the internals.

Figure 3:
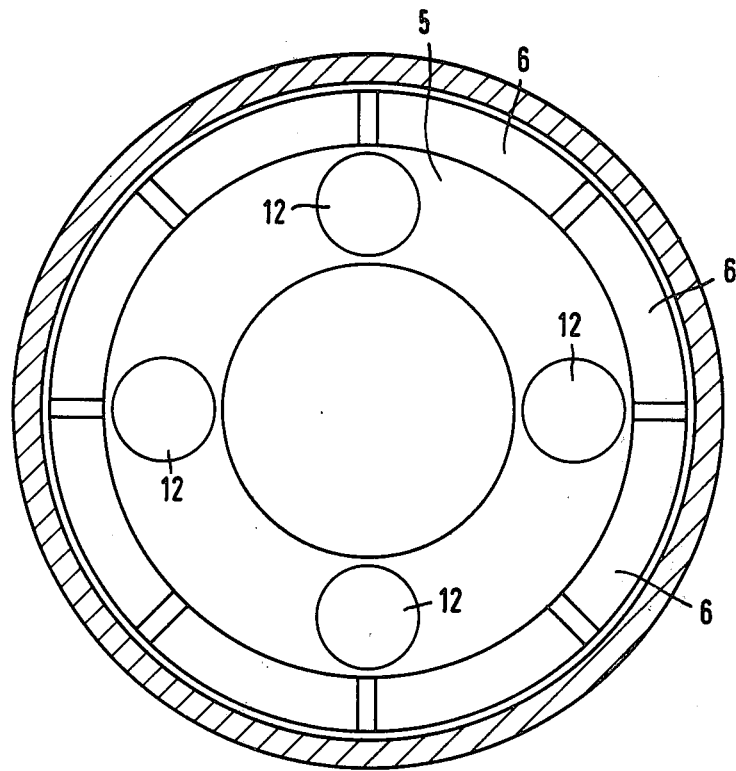
FIG. 3 is a horizontal section through the hollow ring.

FIG. 3 shows in a cross section through the pressure vessel a view from below onto the hollow ring 5 with the pump inlets 12 as well as the openings 6.

What is claimed is:

1. An integrated pressurized-water reactor and steam generator combination comprising a pressure vessel having an inside with upper and lower portions, said lower portion including a vertical surface, and internals in said inside and including a core in said lower portion, coolant circulating pumps in said upper portion and having coolant intakes, and a steam generator interposed between said core and said intakes, said internals being removable from said vessel without their destruction; wherein the improvement comprises a hollow ring connected with and supported by said upper portion, and a hollow cylindrical housing having an upper end connected to said hollow ring and suspended thereby, said housing having coolant flow openings and said steam generator being positioned in and supported by said housing said housing being free to expand downwardly from said hollow ring and all said internals being suspended via said housing.

2. The combination of claim 1 in which said core and a core support structure above the core, are suspended in said housing.

3. The combination of claim 1 in which said housing has a lower end and means for supporting said lower end radially against said vertical surface of said pressure vessel while permitting said lower end to slide vertically on said surface relative to said vessel's inside.

4. The combination of claim 1 in which said pumps have pressure outputs and said outputs connect with the inside of said hollow ring to form a pressure chamber therefor.

5. The combination of claim 1 in which said housing and the pressure vessel's inside form therebetween an annular channel, said pumps have pump housings positioned in said ring and forming said intakes and said ring has a bottom wall through which said intakes open to the inside of said housing, said pump housings having pressure output outlets opening to the inside of said ring so the ring forms a pressure chamber for the pumps, said ring having outer peripheral openings communicating with the outside of said housing.

6. The combination of claim 1 in which said housing contains a support structure positioned above said core, and mounting core control rod drives.

7. An integrated pressurized-water reactor and steam generator combination comprising a vertical pressure vessel having a cylindrical inside and an open top normally closed by a removable closure head, internals in said inside a hollow ring within said inside and releasable means for positioning said ring beneath said closure head and adjacent to said open top, an annular steam generator housing within said inside and supported by and depending from said hollow ring, said housing having an outer wall radially spaced from said inside and forming an annular downwardly extending canal, at least one pump position in said hollow ring and having an intake connection with a top end of said housing and an output connection with a top end of said canal, said connections being formed via openings in said hollow ring, a reactor core positioned within the vessel's said inside below said steam generator housing and having means for guiding a coolant flow descending in said canal upwardly through the core and into a bottom end of said housing, said housing having a lower end provided with lateral supports engaging the vessel's said vertical inside in a vertically slidable manner, said hollow ring, pump and housing being removable upwardly as a unit through said vessel's top end when said closure head is removed and upon release of said releasable means said housing being free to expand downwardly from said hollow ring and all said internals being suspended via said housing.

8. The reactor of claim 7 in which a support structure is supported by an inner periphery of said hollow ring and said structure has means suspending therefrom within said annular steam generator housing for positioning said core.

* * * * *